(12) United States Patent
Gächter et al.

(10) Patent No.: US 6,714,285 B2
(45) Date of Patent: Mar. 30, 2004

(54) OPTICAL RANGEFINDER

(75) Inventors: Bernhard Gächter, Balgach (CH); Urs Vokinger, Au (CH)

(73) Assignee: Leica Geosystems A.G., Heerbrugg (CH)

(*) Notice: Subject to any disclaimer, the term of this patent is extended or adjusted under 35 U.S.C. 154(b) by 0 days.

(21) Appl. No.: 10/297,216

(22) PCT Filed: May 22, 2001

(86) PCT No.: PCT/EP01/05859
§ 371 (c)(1),
(2), (4) Date: May 5, 2003

(87) PCT Pub. No.: WO01/94883
PCT Pub. Date: Dec. 13, 2001

(65) Prior Publication Data
US 2003/0164937 A1 Sep. 4, 2003

(30) Foreign Application Priority Data
Jun. 3, 2000 (EP) .................................................. 0112058

(51) Int. Cl.⁷ ............................ G01C 3/08; H01L 31/14
(52) U.S. Cl. ..................... 356/4.01; 356/5.01; 356/5.1; 250/553
(58) Field of Search ................................. 356/4.01–5.15, 356/28, 28.5; 250/553

(56) References Cited

U.S. PATENT DOCUMENTS

| | | | | |
|---|---|---|---|---|
| 3,691,390 A | * | 9/1972 | Chow et al. | |
| 3,875,534 A | * | 4/1975 | Hauen | |
| 4,185,891 A | * | 1/1980 | Kaestner | |
| 5,394,492 A | * | 2/1995 | Hwang | |
| 5,532,813 A | * | 7/1996 | Ohishi et al. ............... 250/553 |
| 5,734,504 A | * | 3/1998 | Billman | |
| 5,883,706 A | * | 3/1999 | Basu ........................ 356/4.01 |

* cited by examiner

Primary Examiner—Stephen C. Buczinski
(74) Attorney, Agent, or Firm—Van Dyke, Gardner, Linn & Burkhart, LLP

(57) ABSTRACT

In order to improve target illumination a light emitter comprises several partial light sources (3a, 3b, 3c, 3d), the partial beams (5a, 5b, 5c, 5d) of which are collected by means of a beam collector optic (2) and directed to the aperture of a collimator (1). The beam collector optic (2) comprises two half-mirrored sheets (12a, 12b), which each direct two similarly polarized partial beams (5a, b; 5c, d) side by side onto a polarization cube (13), where the pairs of partial beams which are polarized perpendicular and orthogonal to each other are overlaid.

19 Claims, 3 Drawing Sheets

OPTICAL RANGEFINDER

FIELD OF THE INVENTION

The invention relates to an optical rangefinder as used, for example, in surveying plots of ground and structures.

PRIOR ART

Optical rangefinders of the generic type have long been known. However, the luminance of the usually used emitters having a laser diode as a light source is as a rule lower than will be permissible from the point of view of eye protection. Moreover, the light beam emitted by an individual laser diode usually has a disadvantageous, very elongated cross-section, which can lead to insufficient focusing onto the target and consequently to an inadequate luminous flux and measuring errors. For these reasons, the range and accuracy of measurement and reliability of measurement of rangefinders of the generic type will be less than desirable and in principle also possible.

SUMMARY OF THE INVENTION

It is the object of the invention to provide an optical rangefinder of the generic-type whose emitter has a high luminance and ensures good target illumination and high luminous flux at the target.

The advantages achieved by the invention lie in particular in a decisive improvement in the range, i.e. in the maximum measured distance or, for a given range, an increase in the accuracy of measurement. These advantages are achieved with a relatively small emitter optical system, which makes it possible to keep the dimensions of the entire device small.

BRIEF DESCRIPTION OF THE DRAWINGS

The invention is explained in more detail below with reference to figures which merely represent the examples.

DESCRIPTION OF THE PREFERRED EMBODIMENTS

An optical rangefinder according to the invention has an emitter and a receiver which, for example, may be composed in a known manner of an optical system and avalanche photodiodes as well as an electronic control and evaluation unit, likewise of known design, which controls the emission of light pulses by the emitter and evaluates the output signal of the receiver which receives the reflected light pulses. The distance measurement can be effected by transit time measurement or by the phase comparison method. Here, "light" is always to be understood as meaning that it is not limited to the visible range of the spectrum but also includes at least the infrared range.

The emitter of a rangefinder according to the invention may have large differences in its basic design. In every case, however, it has (FIGS. 1–5) a collimator 1 and a light source arranged before said collimator and consisting in each case of at least two partial light sources, as well as a beam-collecting optical system 2 arranged in the beam path between the light source and the collimator. Each partial light source contains a laser diode, which is usually an edge emitter, or a plurality of such laser diodes arranged in succession in the direction of the emission edges. The wavelength common to all laser diodes is the infrared range, preferably from 850 nm to 980 nm, or 1550 nm. The cross-section of the light beam emitted by a laser diode can in each case be reduced parallel to the emission edge and increased transverse thereto by superposition by means of a beam-forming optical system arranged very close to the emission edge and based on light diffraction or refraction, and the light beam can thus be more highly focused.

With wavelengths from 850 nm to 980 nm, the beam can be focused to a very narrow beam, which permits distance gradation with high lateral resolution. Wavelengths of about 1550 nm are also very advantageous because the upper limit of the permissible individual pulse energy of about 8 mJ, which is determined by eye safety, is a factor of about 16000 higher than at wavelengths from 630 nm to 980 nm. The at least partial use of this factor, which is possible according to the invention, permits a very substantial increase in the range or—at a given range—in the accuracy of measurement.

Figures 1A, 1B:
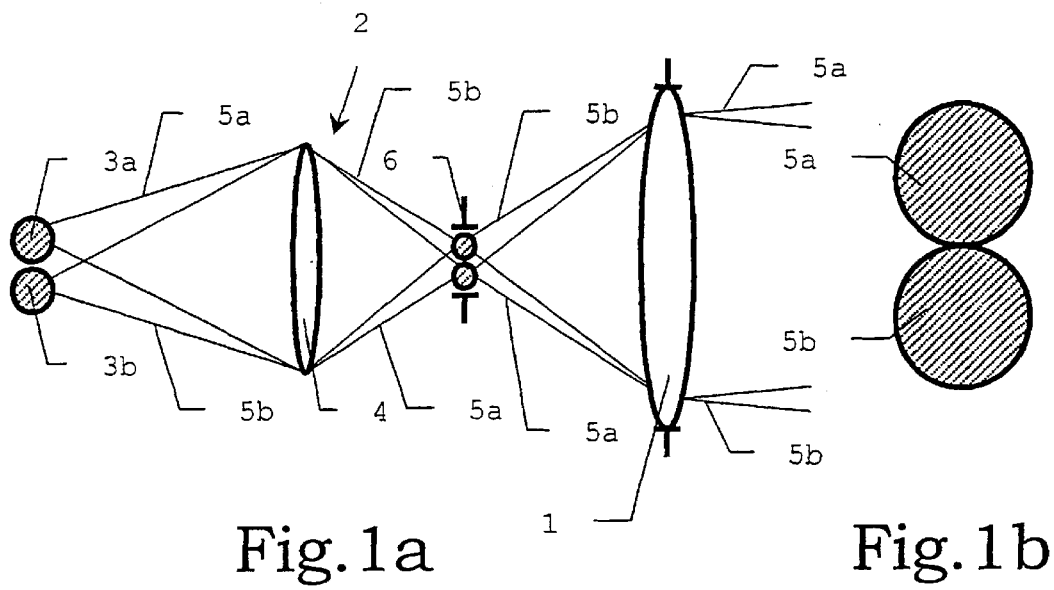
FIG. 1a shows a diagram of the emitter of a first embodiment of a rangefinder according to the invention.
FIG. 1b shows the beam cross-section of the emitter according to the first embodiment at the target.
Figures 2A, 2B:
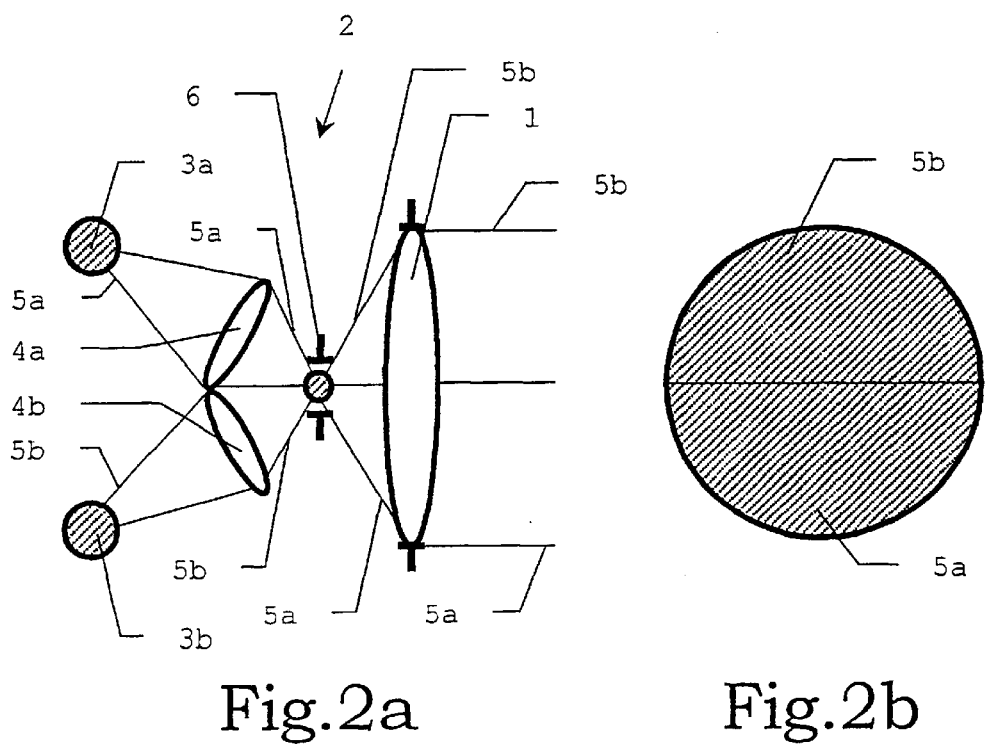
FIG. 2a shows a diagram of the emitter of a second embodiment of a rangefinder according to the invention.
FIG. 2b shows the beam cross-section of the emitter according to the second embodiment at the target.
Figure 3:
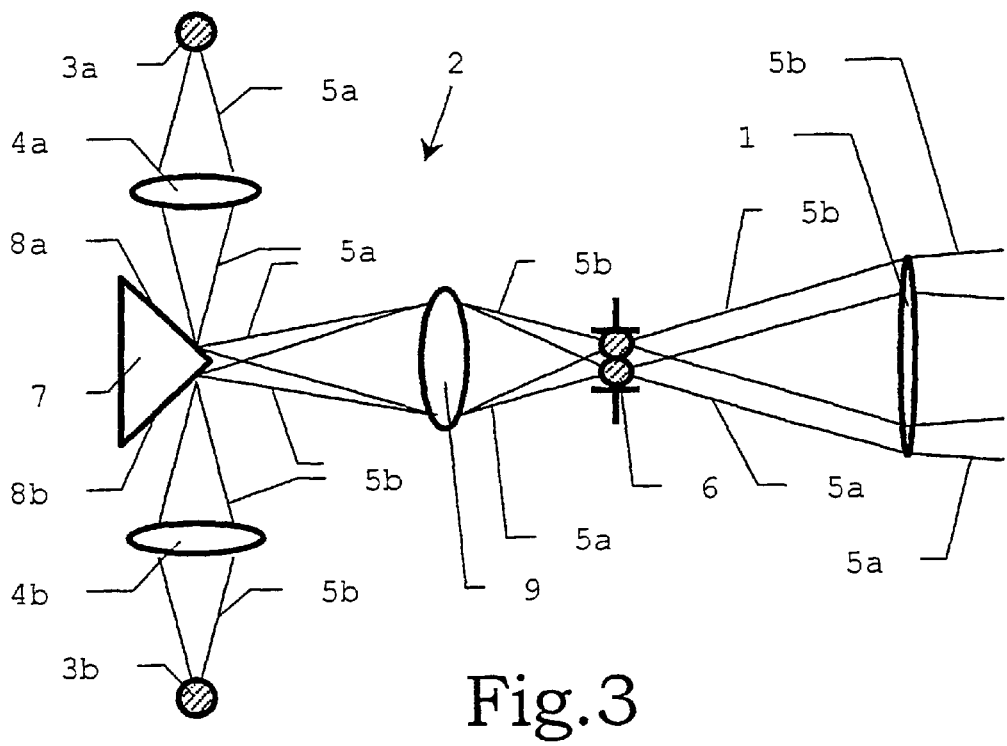
FIG. 3 shows a diagram of the emitter of a third embodiment of a rangefinder according to the invention.
Figure 4:
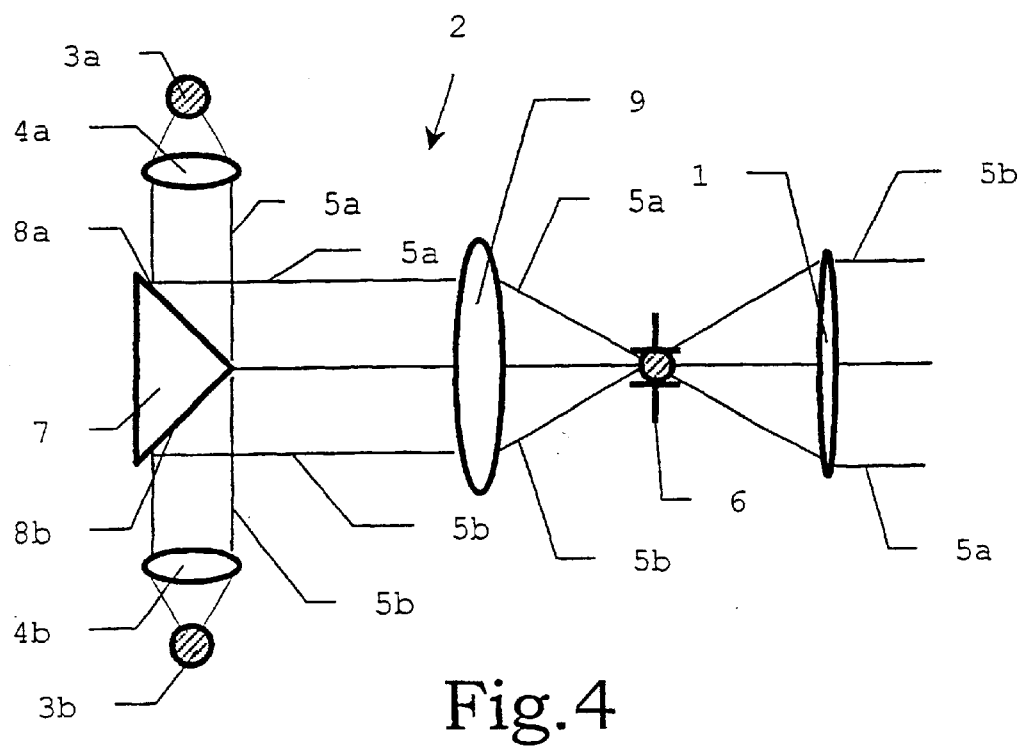
FIG. 4 shows a diagram of the emitter of a fourth embodiment of a rangefinder according to the invention, FIG. 5 schematically shows the design of the emitter of a fifth embodiment of a rangefinder according to the invention

According to the first diagram (FIG. 1a), the light source consists of two partial light sources 3a,b arranged directly side by side. The beam-collecting optical system 2 is in the form of a collecting optical system 4 which is common to both partial light sources and collects partial beams 5a,b emitted by said partial light sources in the object plane 6 of the collimator 1. They enter the aperture of the collimator 1 in such a way that each individual partial beam 5a,b substantially fills the aperture and therefore their cross-sections substantially overlap there. At the collimator 1, the partial beams 5a,b then diverge again, but only to such an extent that their cross-sections lie directly side by side at the target (FIG. 1b). The light beam emitted by the emitter has, at the target, a luminous flux which is approximately twice as great as that of a light beam emitted by an individual laser diode.

According to the second diagram (FIG. 2a), the partial light sources 3a,b are further apart. A separate collecting optical system 4a;b which once again collects the partial beam 5a or 5b emitted by it in the object plane 6 of the collimator 1 is coordinated with each partial light source. The partial beams 5a,b are incident side by side on the aperture of the collimator 1, in such a way that they substantially completely fill said aperture and then form a parallel light beam of circular cross-section at the collimator 1 (FIG. 2b), which therefore has, at the target, not only approximately twice as high a luminous flux as a light beam emitted by individual laser diode, but also a more advantageous cross-section.

According to the third diagram (FIG. 3), the partial light sources 3a,b are arranged opposite one another, and the beam-collecting optical system 2 has collecting optical systems 4a;b arranged after said partial light sources, as well as a prism 7 arranged between said optical systems and in the form of a diverter element. The prism 7 has two reflection surfaces 8a,b which divert the partial light beams 5a,b emitted by the partial light sources 3a,b into a further, common collecting optical system 9 which collects them, in a manner similar to the light source according to the first diagram, in the object plane 6 of the collimator 1 and directs them to its aperture, where they substantially overlap. The beam cross-section corresponds to FIG. 1b. The use of a diverter element makes it possible to arrange the partial light sources 3a,b relatively far apart, which facilitates the cooling of the laser diodes.

The fourth diagram (FIG. 4) corresponds substantially to the third one. The difference is in particular in the fact that the collecting optical systems 4a,b, 9 are adjusted differently, in such a way that, similarly to the light source according to the second diagram, there is virtually no overlap of the partial light beams 5a,b, but the aperture of the collimator 1 is filled by the partial beams 5a,b incident on it side by side, and they then propagate at said collimator substantially parallel in such a way that the beam cross-section corresponds to FIG. 2b.

Figure 5:
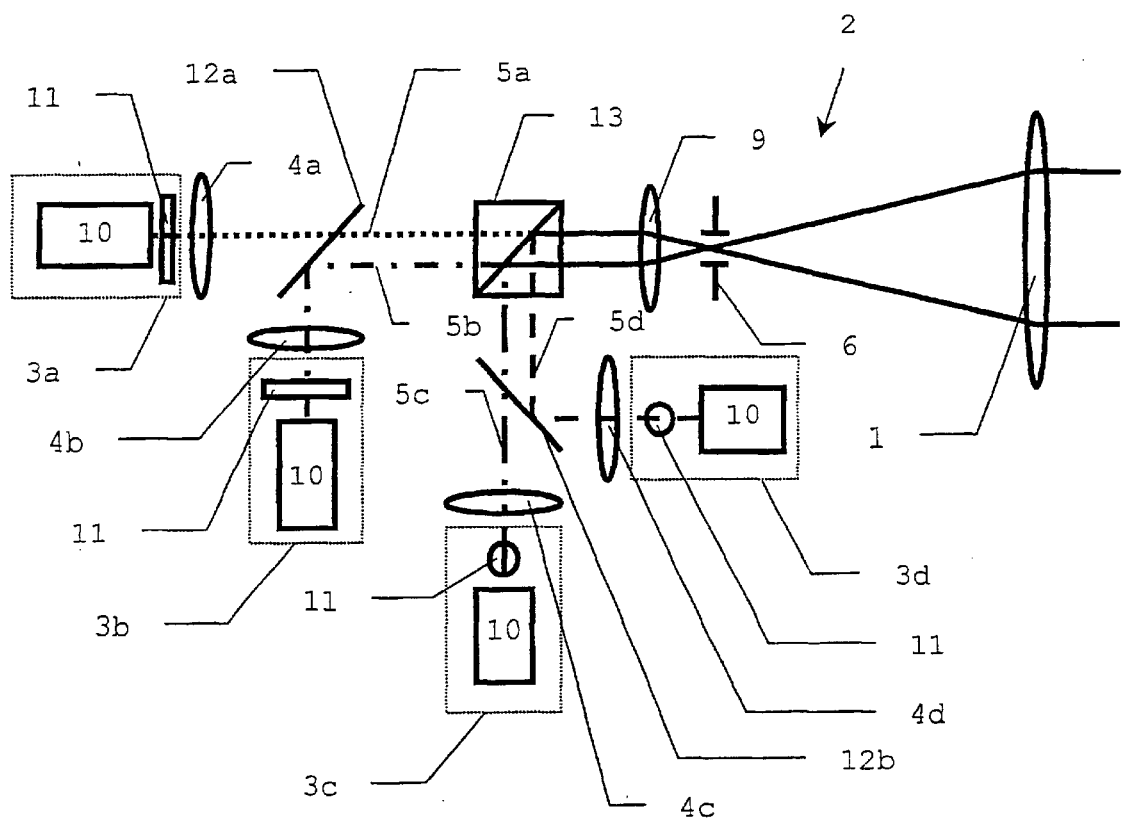

FIG. 5 shows, likewise schematically but in more detail, the structure of the emitter of a rangefinder according to the invention, which corresponds to a further diagram. In addition to a collimator 1 and a beam-collecting optical system 2, it contains partial light sources 3a,b, which emit partial beams 5a,b of the same polarity which are oriented perpendicular to one another, and two further partial light sources 3c,d, which likewise emit partial beams 5c,d which are oriented perpendicular to one another and whose polarization is orthogonal to that of the partial beams 5a,b. The partial light sources 3a,b,c,d consist in each case of a laser diode 10 and a cylindrical lens 11 arranged a small distance away from said laser diode. A collecting optical system 4a;b;c,d is arranged after each of the partial light sources 3a,b,c,d.

Figure 6:
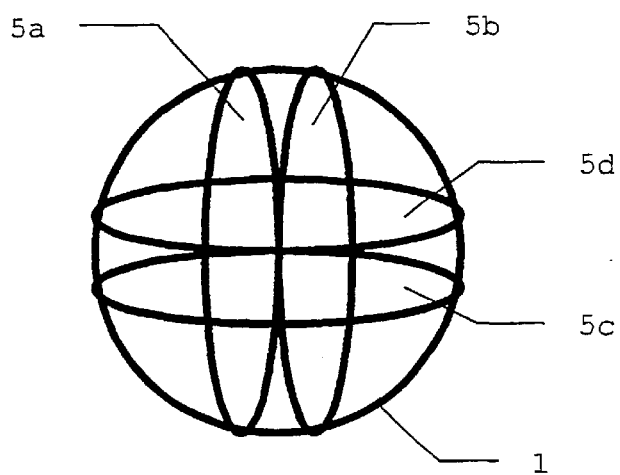
FIG. 6 shows the aperture of the collimator of the fifth embodiment of the rangefinder according to the invention and the beam cross-section at said collimator.

A plate 12a which is half-mirrored and half-transparent so that it transmits the partial beam 5a but diverts the partial beam 5b in a direction parallel to the partial beam 5a is arranged, as a first diverter element, after the collecting optical systems 4a,b. The second diverter element arranged after the collecting optical system 4c,d is, like the first diverter element, in the form of a half-mirrored and half-transparent plate 12b which transmits the partial beam 5c while it diverts the partial beam 5d in a direction parallel to said partial beam 5c. The partial beams 5a,b on the one hand and 5c,d on the other hand each reach, directly side by side, a polarization cube 13, where the pairs of partial beams meet at right angles. The partial beams 5a,b in each case partially overlap with the partial beams 5c,d which are polarized orthogonally to them and are collected by a further collecting optical system 9 in the object plane 6 of the collimator 1 and directed onto its aperture, which is substantially filled in this way (FIG. 6). In the centre of the cross-shaped light spot is an approximately square spot of twice the luminance, where in each case two partial beams of orthogonal polarization overlap.

Various modifications of the examples described are possible. Thus, in particular in the case of diagrams 1 to 4, more than the two partial light sources shown can be used. The collection of partial beams by diverter elements can be cascaded for increasing the number of partial light sources, etc. Finally, it is also possible to use laser diodes having wavelengths of, in particular, from 600 nm to 1000 nm and in particular from 630 nm to 980 nm, which are outside the above-mentioned ranges.

List of Reference Numerals
1 Collimator
2 Beam-collecting optical system
3a,b,c,d Partial light sources
4, 4a,b,c,d Collecting optical systems
5a,b,c,d Partial beams
6 Object plane of 1
7 Prism
8a,b Reflection surfaces
9 Collecting optical system
10 Laser diode
11 Cylindrical lens
12a,b Plates
13 Polarization cube

What is claimed is:

1. Optical rangefinder having an emitter which comprises a collimator and a light source arranged before said collimator, and having a receiver and a control and evaluation unit, said light source comprising a plurality of partial light sources, each having a laser diode and all laser diodes emitting at substantially the same wavelength, and a beam-collecting optical system which is arranged after said partial light sources and collects the partial beams emitted by said partial light sources and directs them into an aperture of said collimator wherein the partial beams are directed into the aperture of the collimator in such a way that the partial beams overlap substantially or slightly and the partial beams propagate substantially parallel from said collimator.

2. Optical rangefinder according to claim 1, wherein the wavelength is from 630 nm to 980 nm, in particular from 850 nm to 980 nm.

3. Optical rangefinder according to claim 1, wherein the wavelength is about 1550 nm.

4. Optical rangefinder according to claim 1, wherein the beam-collecting optical system has at least one collecting optical system arranged in the beam path between said plurality of partial light sources and said collimator.

5. Optical rangefinder according to claim 4, wherein said at least one collecting optical system is immediately after said plurality of partial light sources.

6. Optical rangefinder according to claim 4, wherein said at least one collecting optical system includes a plurality of collecting optical systems, a separate one of said collecting optical systems arranged immediately after each of said plurality of partial light sources.

7. Optical rangefinder according to claim 6, wherein said beam-collecting optical system has at least one diverter element which in each case diverts at least one partial beam emitted by one of said plurality of partial light sources.

8. Optical rangefinder according to claim 7, wherein said at least one diverter element is in the form of a prism having a plurality of reflection surfaces.

9. Optical rangefinder according to claim 7, wherein said at least one diverter element is in the form of an at least partly mirrored plate.

10. Optical rangefinder according to claim 9, wherein said beam-collecting optical system has at least one superposition element for superposing partial beams of different, orthogonal polarization.

11. Optical rangefinder according to claim 10, wherein said at least one superposition element is in the form of a polarization cube.

12. Optical rangefinder according to claim 1, wherein said beam-collecting optical system has at least one diverter element which in each case diverts at least one partial beam emitted by one of said plurality of partial light sources.

13. Optical rangefinder according to claim 12, wherein said at least one diverter element is in the form of a prism having a plurality of reflection surfaces.

14. Optical rangefinder according to claim 13, wherein said at least one diverter element is in the form of an at least partly mirrored plate.

15. Optical rangefinder according to claim 14, wherein said beam-collecting optical system has at least one superposition element for superposing partial beams of different, orthogonal polarization.

16. Optical rangefinder according to claim 15, wherein said at least one superposition element is in the form of a polarization cube.

17. Optical rangefinder according to claim 1, wherein said beam-collecting optical system has at least one superposition element for superposing partial beams of different orthogonal polarization.

18. Optical rangefinder according to claim 17, wherein said at least one superposition element is in the form of a polarization cube.

19. The optical rangefinder according to claim 8, wherein said at least one diverter element is in the form of an at least partly mirrored plate.

* * * * *